United States Patent [19]

Vaida et al.

[11] Patent Number: 4,848,538
[45] Date of Patent: Jul. 18, 1989

[54] CARRIER AND VARIABLE POSITION CARRIER BODY

[75] Inventors: Robert M. Vaida, Ellington; Harold L. Osthus, West Willington, both of Conn.

[73] Assignee: Gerber Garment Technology, Inc., Tolland, Conn.

[21] Appl. No.: 216,094

[22] Filed: Jul. 7, 1988

[51] Int. Cl.[4] .............................................. B65G 47/90
[52] U.S. Cl. ................................. 198/803.7; 198/678; 294/103.1; 294/81.6
[58] Field of Search ............... 198/803.7, 803.8, 803.9, 198/678, 803.3; 248/316.4; 294/103.1, 117, 81.6, 86.62

[56] References Cited

U.S. PATENT DOCUMENTS

| 3,904,027 | 9/1975 | Gilles et al. | 198/803.7 |
| 3,960,264 | 6/1976 | Carbine et al. | 198/678 X |
| 4,727,979 | 3/1988 | Wolfson et al. | 198/803.3 |
| 4,760,912 | 8/1988 | Vaida | 198/678 |

Primary Examiner—Robert J. Spar
Assistant Examiner—Lyle K. Kimms
Attorney, Agent, or Firm—McCormick, Paulding & Huber

[57] ABSTRACT

A hanger for use in a conveyorized system for transporting limp sheet material has a gripper assembly for quick loading and unloading of a unit of work material onto or off of the hanger and includes a longitudinally slidable gripping element cooperating with a fixed gripping surface urged toward the fixed surface by biasing device and is selectively actuated by fingertip pressure exerted on two laterally outwardly extending flanges respectively extending from a body portion supporting the gripping element and a top portion of the gripping element. The hanger may employ a carrier supporting a plurality of gripper assemblies oriented in a spaced relationship with one another and having means by which the orientation of each of the gripper assemblies may be changed.

13 Claims, 3 Drawing Sheets

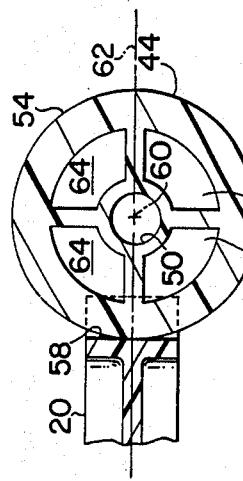
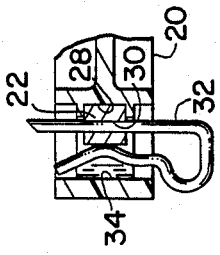
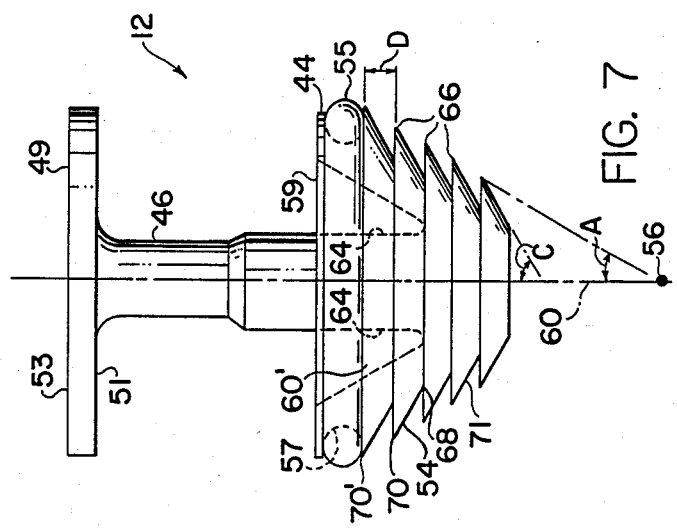
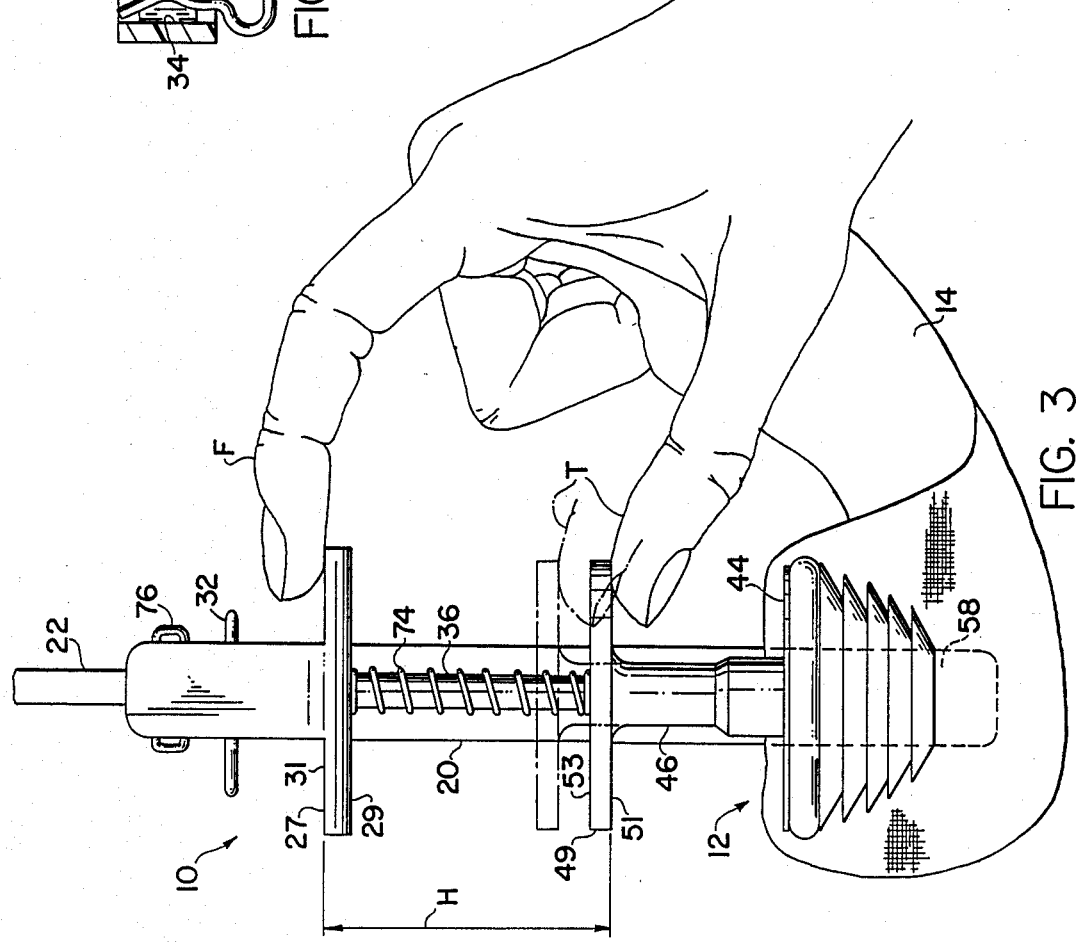

CARRIER AND VARIABLE POSITION CARRIER BODY

CROSS-REFERENCE TO RELATED APPLICATION

The present application relates to U.S. patent application Ser. No. 056,459, filed May 29, 1987, titled CONVEYOR HANGER WITH CIRCULAR WEDGE GRIPPER now U.S. Pat No. 4,760,912 having a common assignee with the present invention.

BACKGROUND OF THE INVENTION

This invention relates to a hanger for holding and releasing one or more pieces of limp material such as textile garment pieces either as individual pieces or as groups or stacks of such pieces and for attachment to a conveyor trolley for moving the pieces from work station to work station in a conveyorized garment making plant or the like, and deals more particularly with an improved construction of such a hanger employing one or more fast action grippers for quickly attaching and/or detaching the textile pieces as work is performed on the garment pieces from one work station to the next.

When garment pieces are moved by conveyor trolleys along a track in a garment making plant such as in the environment disclosed in the above-referenced application, operators at respective work stations are assigned to perform a particular operation on the garment piece. The hanger disclosed in the above-referenced application utilizes an axially slidable spring biased circular wedge element rotatably cooperating with a fixed surface on a body supported by the hanger to removably fix the limp material to the hanger. To detach and/or attach a unit of limp material to the hanger in this device, an operator usually must employ both hands to accomplish this operation. That is, the operator usually must utilize one hand to hold steady the hanger and the trolley assembly and must use the other hand to either grasp and subsequently urge the wedge element back against the biasing spring or to pull the garment piece laterally against the rolling engagement of the circular wedge cooperating with the fixed surface of the body. This manual operation can be inefficient and may introduce costly time delays created by the operator as the units of limp material are off-loaded from and/or loaded onto the hanger.

In such a work environment, it is also desirable to attach to the hanger, garment materials such as satin or silk having very thin thicknesses and having very smooth surfaces which are transported from one work station to the next. It has been found, however, that the cooperation between the circular wedge element and the fixed surface of the hanger body disclosed in the above-referenced application can at times be insufficient to positively grip and hold such thin sheets of material formed from fabrics having a smooth texture such as silk, polyester or satin.

Accordingly, the general object of the present invention is to provide a conveyor hanger having at least one gripper capable of being actuated by single hand manipulation for releasably holding in place a unit of work material and being capable of quickly loading and reloading the unit of work material by the single hand actuation of the gripper onto and off of the hanger with an efficiency of movement.

Another object of the invention is to provide an improved gripper having a gripping element having an enhanced gripping capability for gripping a unit of material having a smooth texture onto the hanger.

Yet another object of the invention is to provide a hanger construction readily usable in a conveyor system having a plurality of gripping assemblies supported thereon and each of the assemblies being capable of being readily reoriented on the hanger thereby providing an operator located at a work station with a means for accessing that material initially oriented away from the work station.

SUMMARY OF THE INVENTION

The invention resides in a hanger employed in a conveyorized system for transporting pieces of limp material from work station to work station and involves the hanger having a body carrying quick release means for rapidly loading and/or unloading the pieces of limp sheet material from the hanger. The body has a flange extending generally outwardly from the remainder of the body. A substantially straight pin, having a longitudinal axis and first and second ends is fixed to the body at the first end and beyond the first end extends away from the body to the second end. A gripping element is mounted on the pin and is oriented about the longitudinal axis for movement relative to the pin and the gripping element has a flange extending generally outwardly from the remainder thereof. The gripping element further has an external gripping surface and cooperates with a generally planar fixed gripping surface on the body to grip the limp material between the gripping element gripping surface and the fixed gripping surface of the body. Biasing means urges the gripping element along the longitudinal axis of the pin toward the fixed gripping surface and engage the element gripping surface with the fixed gripping surface on the body. The body flange and the gripping element flange being simultaneously engagable with and manipulatable by the thumb and fingers of an operator's hand to move the gripping element against the force of the biasing means.

The hanger may also incorporate a plurality of gripping assemblies supported by a carrier having a carrier body mounting at least two gripping assemblies in a spaced relationship with one another. The carrier and the carrier body are interconnected by a carrier shaft rotatably supporting the carrier body. The carrier shaft mounts biasing means which applies a force against the carrier body to selectively position each of the plurality of gripping assemblies in a fixed, spaced relationship with one another.

BRIEF DESCRIPTION OF THE DRAWINGS

FIG. 3 is a side elevation view of the hanger in FIG. 1 taken looking toward the left in FIG. 2 and illustrates the cooperation between the flange portions and the operator's hand movements to produce the desired quick release function of the hanger.

FIG. 5 is a fragmentary horizontal section taken along the line 5—5 of FIG. 2.

FIG. 6 is a fragmentary horizontal sectional view taken along the line 6—6 in FIG. 2.

FIG. 7 is a side elevation view in an enlarged scale of the circular wedge element of the hanger of FIG. 1 illustrating the truncated cone shape of the wedge element.

DETAILED DESCRIPTION OF THE PREFERRED EMBODIMENT

Figure 1:
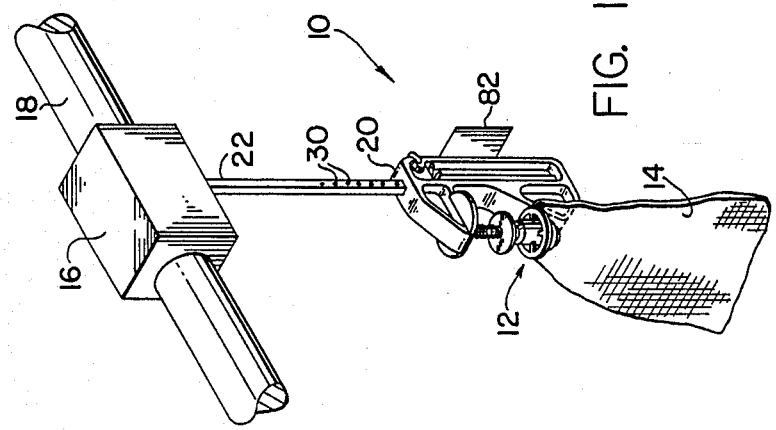
FIG. 1 is a perspective view showing a portion of the conveyor system using a hanger embodying the present invention, the parts of the conveyor apart from the hanger being shown only schematically.

As is shown in FIG. 1, a hanger 10 having a single gripper 12 for holding a unit of work material 14 is connected to a trolley 16 riding on a rail 18 all of which may form part of a conveyor system for transporting work material such as the unit 14 from one work station to the next in a garment making plant or the like. Typically, the trolley 16 and the track 18 employ various forms which are well known and the track 18 is usually associated with a moving chain or other powered element for moving the trolley 16 and others like it along the track. Also typically associated with the track 18 are switches which direct the trolleys 16 along the track 18 to stations where an operator rapidly performs a work operation on successive units of material carried by the respective successive trolleys that are moved along the track 18. When a trolley 16 and the associated hanger 10 holding the work piece 14 reach a designated work station, the trolley is generally disengaged from the track drive mechanism and thereafter remains immobile relative to the work station. Subsequently, the operator either loads new material onto the hanger or unloads material from the hanger and works on the material and thereafter reloads the worked material onto the hanger. Depending on the circumstances, the work material unit 14 may either be a single sheet or a work piece or a stack or group of such sheet or work pieces.

Turning now to FIGS. 2-7, the structure of the hanger 10 is shown in detail. The hanger 10 consists generally of a body 20 made of a rigid material such as nylon or other molded plastic. The body 20 has a vertically extending portion 24 and a top portion 26 extending laterally outwardly from one side of the vertically extending portion 24. The hanger 10 is connected with the trolley 16 through a rod 22. The rod 22 is received within a first opening 28 preferably formed through the longitudinal extent of the vertically extending portion 24. A second opening or slot 34 communicates with the opening 28 and is oriented transversely thereto. The rod 22 includes a number of transverse through openings 30 spaced along its length. A retaining clip 32 is readily removable and insertable within the second opening or slot 34 and any one of the transverse openings 30 to adjustably mount the body 20 onto the rod 22 when a selected one of the openings 30 is aligned with the second opening 34 and the retaining clip 32 is inserted transversely as is shown in FIG. 5.

The top portion of the hanger body 20 carries a straight pin 36 of a circular cross-section and having a central longitudinal axis 60. The pin has an upper end 38 fixed to the top portion 26 of the body 24. The end 38 is received in an opening formed within the top portion 26 and is preferably fixed therein by adhesive means or the like. An opposite lower free end 40 of the pin 36 has an enlarged flange 42 which may be formed about its periphery either by molding or by providing a snap ring or outwardly swaged localized flange area.

A gripping element 44 is carried by the pin 36 and cooperates against the biasing action of a spring 74 to maintain a vertical section of the element 44 in an abutting relationship with a fixed gripping surface 58 formed on the body 20. The gripping element 44 has an upper stem portion 46 with a central opening 48 sized to receive the outer surface of the pin 36 in a sliding and if desired rotational relationship therewith. At the end of the gripping element 44 opposite the stem portion 46 is formed a second opening 50 of a larger diameter than opening 48 and communicating therewith to provide a passage throughout the length of the element 44. Between the opening 48 and the opening 50 is a radial shoulder 52 engagable with the flange 42 on the pin 36 which is accommodated within the larger diameter of the opening 50. It should be understood that during the normal operation of the gripping element 44, the radial shoulder 52 is spaced from the flange 42 by the thickness of the work material 14 which pushes upwardly against the bias of a spring 74 coaxially oriented about the pin 36.

The gripping element 44 has a lower portion with a generally conical external gripping surface 54 and has an annular gripping ring 55 preferably extending circumferentially about the upper extent of the lower portion of gripping element 44. As best shown in FIG. 7, the lower portion of the gripping element 44 is actually a truncated cone having an apparent apex 56 and having a cone angle A. The cone angle A is defined by the outwardly extending edges of a plurality of circular barbed shaped ribs 66 and the outer surface of the gripping ring 55 each concentrically arranged about the central axis 60. Angle A may vary and is preferably formed within the range of 15-45 degrees. In the illustrated case of FIG. 7, it is 30 degrees.

Figure 4:
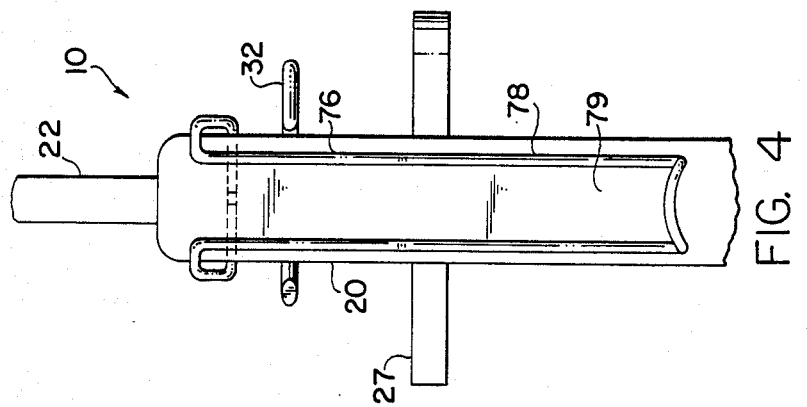
FIG. 4 is a fragmentary side elevation view of the hanger of FIG. 1 taking looking toward the right in FIG. 2, this view being a slightly larger scale than FIG. 2.
Figure 2:
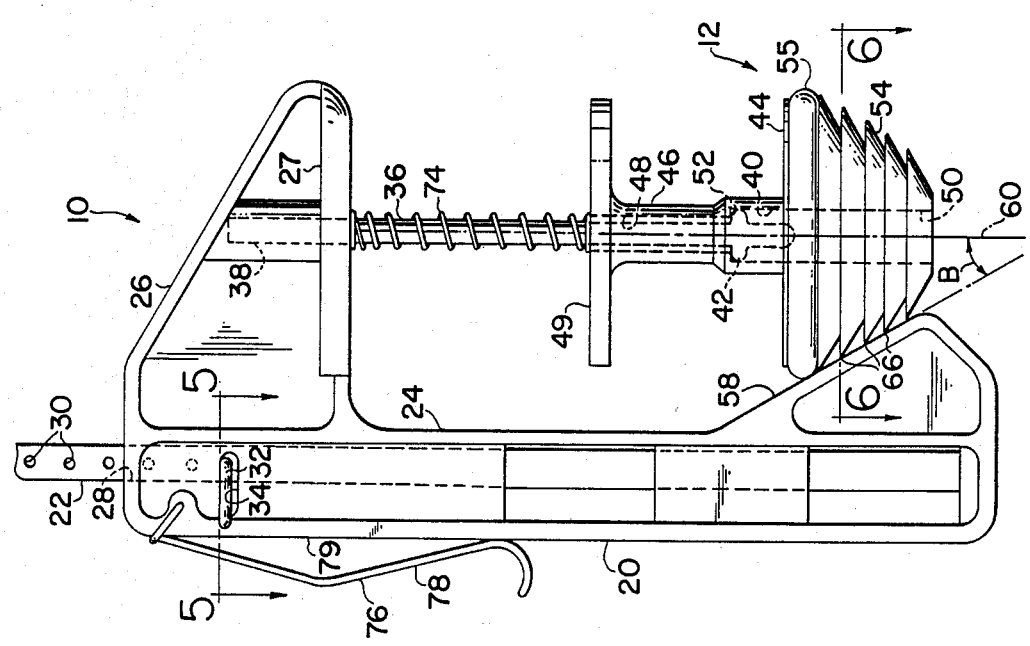
FIG. 2 is a front elevation view of the hanger of FIG. 1.

The gripping surface 54 defined by the gripping ring 55 and the circular ribs 44 cooperates with the fixed gripping surface 58 formed on the lower end of the vertical portion 24 of the hanger 20. The fixed gripping surface 58 is generally planar in shape and is arranged on the body 20 parallel with the angle A defined by the outer extent of the gripping surface. The contact between the planar fixed gripping surface 58 and the conical gripping surface 54 occurs along a vertical section of the surface 54 defined by plane 62 illustrated in FIG. 6. The plane 62 is coincident with the point of tangency between the annular ring 57, the circular ribs 66 and the surface 58. As shown in FIG. 2, the referenced plane 62 is parallel to the drawing sheet and is coincident with the longitudinal axis 60 of the pin 36. Accordingly, the fixed gripping surface 58 is located in a plane perpendicular to the referenced plane 62 and is inclined relative to the longitudinal axis 60 by an angle B (FIG. 2) which angle B is equal to the angle A (FIG. 7) generally defining the shape of the circular wedge element 44. Thus, the gripping surface 54 of the element 44 moves parallel to the fixed gripping surface 58 and will engage the work unit 14 along straight lines to exert a distributed holding or clamping force on the work unit regardless of the thickness of the work unit inserted therebetween.

In the illustrated embodiment, the gripping element 44 utilizes the ribs 66 and the ring 55 to enhance the gripping effect of the circular wedge element 44 on the work unit 14. As seen in FIG. 7, each of the ribs 66 has a first end 68 and a second end having an end surface 70 located in a plane perpendicular to the longitudinal axis 60. The first end 68 is connected to the end surface 70 by an intermediate rib portion 71 proceeding away from the apex 56 joining the end surface 70 to form a tooth or barb-like configuration. Further, for each rib 66 the outer diameter of the end surface 70 is larger than the corresponding annulus defined by the end 68 and such outer diameter of the end surface 70 is also of a larger diameter than the annulus defined by the end 68 of the next adjacent rib proceeding away from the apex 56.

Each intermediate rib portion 71 is oriented at an angle C which is substantially larger than the cone angle A. In the illustrated case of FIG. 7, the angle C is 60 degrees while the cone angle A is 30 degrees. This difference between angular orientation allows for effective gripping action to occur between the circular wedge element 44 and the fixed gripping surface 58. Moreover, the distance D representing the spacing between adjacent ribs 66 equals approximately 3/16 of an inch which spacing is an increase over previous rib spacing used in the circular wedge element disclosed in the prior U.S. Patent application Ser. No. 056,459. It has been found that the increased spacing between the ribs 66 in the present invention creates a greater gripping capability due to the increased spacing allowing for greater amounts of material to be gathered between each rib.

An annular groove 57 is formed about the outer surface of the gripping element 44 in lieu of a circular rib and receives the annular gripping ring 55 therein. The annular gripping ring 55 is generally an O-ring formed from a low durometer polymer such as, for example, White Buna. The surface of the groove 57 has an inwardly directed extent defining a diameter which is slightly larger than the inner diameter of the gripping ring 55 in its untensioned state. The gripping ring 55 is captured within the groove 57 between an annularly oriented, laterally extending lip 59 projecting from the upper portion of the element 44 and an end surface 70' of the uppermost rib 60'. The outer surface of the gripping element 44 extending intermediate the upper lip 59 and the end surface 70' has a curved configuration in vertical cross-section for receiving the correspondingly curved inner surface of the ring 55. The inner diameter of the groove 57 measures approximately 1½ inches. The gripping ring 57 being formed from an elastic material is elastically tensioned when stretched over the element 44 remains tensioned and when brought into engagement with the annular groove 57 such that it is retained within the groove 57 by the inherent elastic memory of the material forming the annular ring 59. The annular ring 59 is formed from a non-marring elastic material and provides significant friction to hold fine and delicate materials such as satin, silk or the like between the element 44 and the fixed support surface 58 without soiling the material with ring marks.

In accordance with the invention, the upper stem portion 46 of the gripping element 44 includes a flange 49 extending laterally and orthogonally to the central axis 60. The flange 49 is a generally circular element in top view having a bottom surface 51 and an opposite top surface 53. The surfaces 51 and 53 are separated by a flange thickness of approximately ⅛ of an inch. The opening 48 is also formed through the flange 49 thus providing a through passage from the upper end of the element 44 through to its lower end. The flange 49 is preferably molded integrally with the upper stem portion 46 of the circular wedge element 44 but may be a separately formed element which, in turn, is attached to the end surface of the upper stem portion 46 by suitable bonding means such as adhesive or the like.

The top portion 26 of the body 20 also carries a flange 27 depending laterally outwardly from the lower extent of the top portion 26 of the body 20. The flange 27 has a bottom surface 29 and an opposite top surface 31 separated by a flange thickness of approximately 3/16 of an inch. The flange 27 is preferably a circular shape in top view and further is preferably formed integrally with a top portion 26 of the hanger body 20. However, the flange 27 may be formed separately as two semicircular individual members each attached to the top portion 26 by suitable bonding means such as adhesive or the like. The flange 27 is formed from a rigid material such as nylon or other molded plastic similar to the material forming the body 20. Also, the flange 27 has an opening coaxially aligned and coincident with the opening formed in the top portion 26 receiving and adhesively securing the top part 38 of the pin 36.

As can be appreciated from the figures, the spring 74 is a helical compression spring working between the top surface 53 of the gripping element flange 49 and the bottom surface 29 of the body flange 27. FIG. 2 shows the element 44 in its lowermost condition in which its conical gripping surface 54 engages the fixed gripping surface 58 and both surfaces are held in engagement with one another by the force exerted through the spring 74 acting against the respective surfaces 53 and 29. From this lowermost position, the gripper 12 may be raised by hand on the pin 36 against the resilient force of the spring 74 to allow the work unit as shown at 14 in FIG. 1 to be inserted between or detached from the element 44 and the fixed gripping surface 58.

As shown in FIG. 3, gripping element manipulation can be accomplished in the present instance by the operator employing the body flange 27 and the gripping element flange 49 to move the element 44 upwardly along the pin 36 against the bias of the spring 74. When the element 44 is oriented in its lowermost position, the top surface 31 of the flange 27 is spaced from the bottom surface 51 of the flange 49 by a distance of approximately 2 inches as is illustrated in FIG. 3 by the measurement labeled as H. The operator employs single hand movement to actuate and move the gripping element 44 from its lowermost position upwardly to allow for the insertion of the work unit between the element 44 and the gripping surface 58. Usually, the operator will position his or her middle finger and/or index finger F on the top surface 31 of the body flange 27 while simultaneously positioning his or her thumb on the bottom surface 51 of the gripping element flange 49. It is noted that the distance H is sufficiently minimal to allow even the smallest of operator hand sizes to grasp the gripping element, flange 49 and the body flange 27 with one hand. The operator then moves his or her thumb T upwardly while holding the entire hanger 10 steady with the finger or fingers F to squeeze the gripping element flange 49 toward the body flange 27 against the biasing force of the spring 74.

The present invention allows the operator, prior to engaging the flanges 27 and 49 to gather a portion of the work unit 14 in his or her fourth and/or fifth fingers, as is shown in FIG. 3, and thereafter causes the work material 14 to be held while a portion of the work unit 14 is still attached to the hanger 10 by the gripping action of the element 44. Thus, an operator may cause the work unit 14 to be held while simultaneously holding steady the hanger 10 and subsequently releasing the material 14 from the grip of the element 44 by a series of small, incremental and coordinated movements accomplished by using a single hand. This efficiency of movement saves a significant amount of time and energy for the operator and allows the operator to increase his or her production during the time otherwise spent making excessive movements.

Likewise, in loading a unit of material 14 onto the hanger 10, the operator need only use one hand to move the gripping element flange 49 to allow the work unit to be placed between the gripper 12 and the surface 58. The operator's remaining hand is thus free to simultaneously load the unit of material 14 onto the readied hanger 10. It should be noted that the lower end 40 of the pin 36 is located within the confines of the element 44 and does not normally project below the lower end of the gripping element. Therefore, it does not interfere in any way with the insertion or the removal of the work unit 14 onto or from the hanger 10.

The gripping element 44 including the flange 49 is preferably made of a molded plastic such as urethane or polyurethane. Further, to avoid dimpling or other distortions in the surface of the wedge element, which might occur due to shrinkage as the molded plastic cools and solidifies after molding if it were made as a solid molded part, it is preferable to design the element 44 so as to be of a substantially thin wall construction throughout. Therefore, as best seen in FIGS. 6 and 7, the element 44 is designed so as to have four hollow pockets 64 giving it the illustrated and desired thin wall character thus avoiding the undesirable distortions which may occur during the molding process.

One of the features of the invention is to provide a means by which an operator can identify the hanger itself or the work unit inserted into the hanger. Alternatively, it may be desired to temporarily attach larger cloth labels to be sewn or otherwise attached to the end product made from the work unit carried by the hanger. For this purpose, the hanger 10 includes a spring clip 76 made of dense spring wire and having a tongue 78 overlying a portion of the back surface 79 of the vertical portion 24 of the hanger body 20 and spring biased into engagement with the back surface 80. Therefore, a ticket or a label such as shown at 82 in FIG. 1 may be releasably held to the hanger by fixing it between the tongue 78 of the spring clip 76 and the back surface 79 of the hanger body 20.

Figure 8:
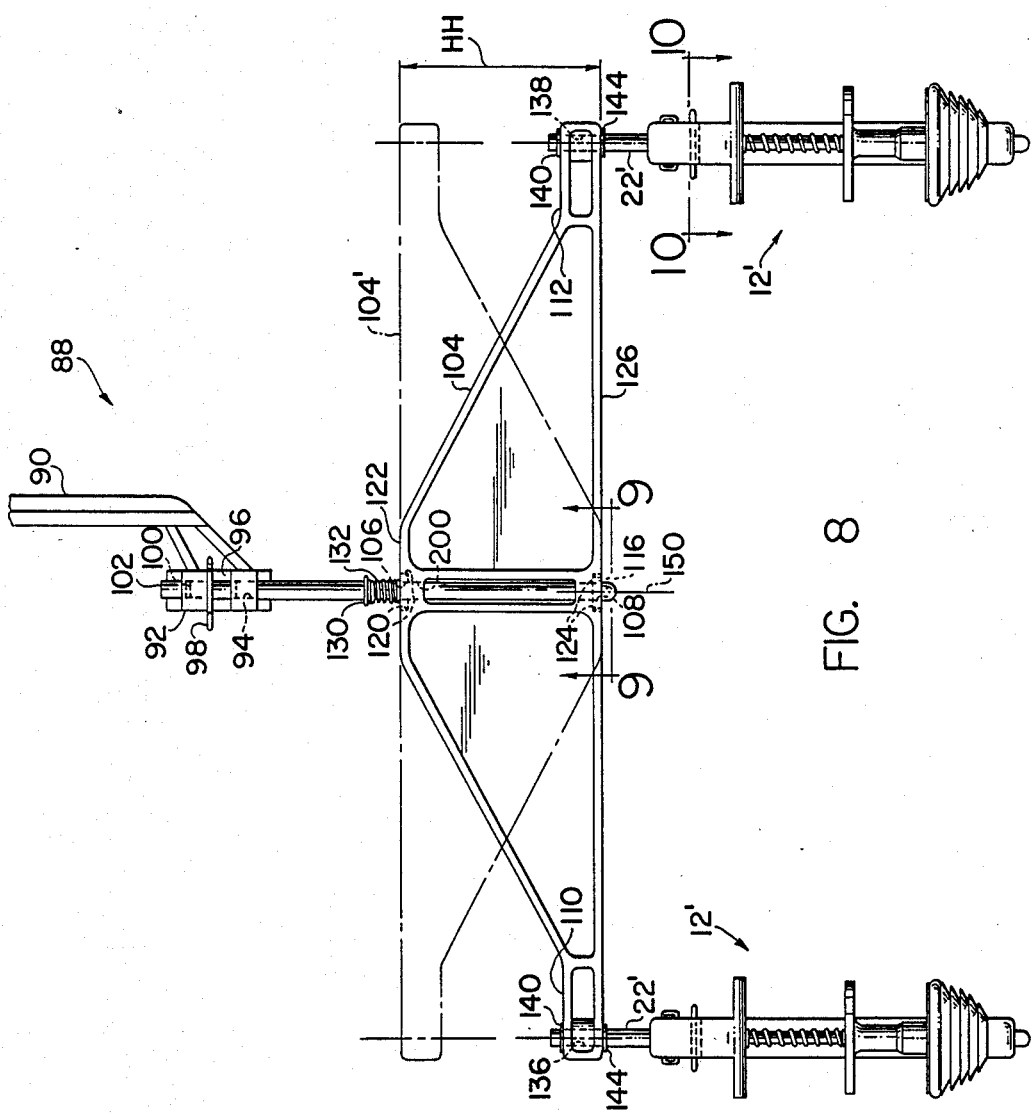
FIG. 8 is a front elevation fragmentary view of a second embodiment of the hanger of the present invention employing a plurality of gripper assemblies laterally spaced apart from one another and showing in phantom line the carrier body invertedly mounted on the hanger.

In accordance with a further aspect of the invention, the illustrated gripping means shown in FIGS. 1-7 may be used with other hanger designs employing more than one gripper. Referring now to FIG. 8, a hanger 88 employs a carrier portion 90 connecting the hanger with a trolley similar to member 16 shown in FIG. 1. The carrier portion 90 has at its lower end a support portion 92 which extends laterally therefrom. The portion 92 has formed throughout its length, a circular opening 94 extending parallel with the carrier portion 90. A transverse slot or opening 96 communicating with the opening 94 is capable of receiving a retaining pin or clip 98. The opening 94 in turn receives a carrier shaft 102 having a series of longitudinally aligned diametrically extending openings 100 at its upper end. A selected one of of the diametrically extending openings 100 is positioned and aligned with the transverse slot 96 and thereafter the retaining clip or pin 98 is laterally inserted into the coaligned openings to axially and rotationally fix the shaft 102 to the carrier portion 90.

A carrier body 104 has an opening 200 extending throughout its height and is coaxially oriented about axis 150 to receive and journal the carrier shaft 102. The diameter of the opening 200 is slightly larger in size than the outer diameter of the shaft 102 to permit the body 104 to rotate relative to the shaft 102. The opening 200 has ends 106 and 108 respectively coincident with carrier body surfaces 122 and 126. The carrier body 104 is axially retained in one longitudinal direction on the shaft 102 by a transversely extending pin 116 fixed to the shaft 102 and having a transverse cross-sectional diameter equal to approximately ⅛ of an inch.

Figure 9:
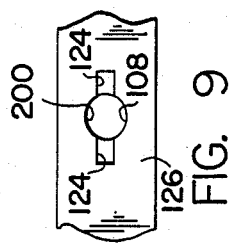
FIG. 9 shows a fragmentary view of one end of the opening taken along line 9—9 in FIG. 8.

The transversely extending pin 116 not only prevents downward movement of the carrier body 104 relative to the carrier shaft 102, but also provides means for selectively reorienting and refixing the carrier body 104 relative to the carrier portion 90. As is shown in FIG. 9, two diametrically opposed slots 124 extend laterally and outwardly from the opening end 108 and communicates with the opening 200 from the surface 126 to a depth in the carrier body 104 equal approximately to the transverse diameter of the pin 116. Similarly, two diametrically opposed slots 120 are formed at the opposite end of the carrier body 104 and have a depth measured from the surface 122 into the body 104 approximately equal to the transverse diameter of the pin 116. A transverse pin or clip 130 is received within a through opening in the carrier shaft 102 adjacent to but spaced from the upwardly oriented surface of the carrier body. A helical coil spring 132 is interposed between the upwardly oriented carrier body surface and the pin 130 to bias the carrier body 140 downwardly and thereby confine the fixed transverse pin 116 within either of the slots 124 or 120.

Since the work stations are positioned on either side of the rail 18, it is preferable to orient the fixed pin 116 on the shaft 102 orthogonally to the direction of travel of the carrier 88 such that the carrier body 104 is oriented perpendicularly with respect to the rail 18. As is shown in FIG. 8, the carrier body supports two gripping assemblies 12' each spaced apart on the carrier 104 by a distance of approximately fourteen inches and each being generally similar to that assembly shown and discussed in FIGS. 1-7. Once the hanger 88 arrives at a work station it is necessary to move the more distally oriented gripping assembly toward the operator after the work material on the more proximately oriented gripping assembly is completed. In so doing, the operator of a particular work station upwardly pushes or pulls the carrier body 104 against the bias of the spring 132 to axially move either of the slots 124 or 120 out of engagement with the transversely fixed pin 116. Subsequently, the operator rotates the carrier body 104 one hundred and eighty degrees to thereby reposition each of the gripper assemblies 12' relative to the work station. Once the carrier body 104 is sufficiently rotated and the slots positioned adjacent the pin 116 line up with the pin 116, the carrier body 104 will automatically lock in place as the weight of the carrier body 104 combined with the bias of the spring 132 drop the carrier body 104 downwardly onto the pin 116.

One of the features of the invention lies in the shape of the carrier body 104. As can be seen in FIG. 8, the carrier body 104 is shaped as a truncated pyramid. Extending laterally from the base of the pyramid are two support arms 110 and 112 having through openings 136 and 138 extending parallel with the axis 150 and being circular in transverse cross-section. Each of the openings 136 and 138 rotatably receives a shaft 22' having a cylindrical outer surface. Also, the shafts 22' have diameters slightly smaller in size than the respective diameters of the openings 136 and 138 which receive each of the shafts 22'. Each shaft 22' is retained on one of the arms 110 and 112 by a retaining washer or clip 140 which prevents the shafts 22' from falling through the carrier body 104. Upward movement of the shafts 22' is prevented by lower lock washers or clips 144 which thereby capture or trap a segment of the rods 22' within the thickness of each of the arms 110 and 112.

The carrier body 104 may either be assembled on the hanger 88 with its base positioned at its bottom as shown in solid line in FIG. 8, or may be inverted and assembled with the hanger 88 as is shown in phantom line at 104' such that the base and the two supporting arms 110 and 112 are positioned at its top. In either orientation, the carrier body 104 is supported on the carrier shaft 102 through the opening 200 and the shafts 12' are likewise supported by the arms 110 and 112 through the openings 136 and 138. It should be understood that when the carrier body 104 is oriented in the inverted position, the slots 120 will be positioned adjacent the pin 116 and will similarly receive the pin 116 when so aligned. As is shown by the phantom line outline 104' in FIG. 8 the distance separating the arms 110 and 112 from the carrier body 104 may be further varied by a distance HH when the carrier body 104 is oriented in its inverted position shown as 104'. The distance HH measures approximately 2.5 inches and therefore, depending on the size of the unit of work material being used, a maximum and a minimum elevation of the gripper assemblies 12' relative to the work stations can be accomplished by selectively assembling the carrier body 104 at either of two orientations to accommodate a particular material length.

Figure 10:
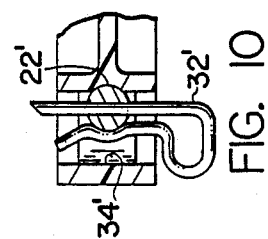
FIG. 10 is a fragmentary horizontal sectional view taken along the lines 10—10 in FIG. 8.

As discussed previously, the through openings 136 and 138 are circular in cross-section and receive the corresponding shape of the shaft 22'. FIG. 10 illustrates in cross-section the circular shape of the shaft 22' and the correspondingly arcuately shaped portion of the body 20' receiving the curved surface of the shaft 22'. The retaining clip 32' and the slot 34' cooperate with a selected one of the plurality of openings 30' formed on the shaft 22' to thereby adjustably fix the body 20' on the shaft 22' as discussed previously with reference to FIGS. 1-7. The circular configuration of the shaft 22' in the embodiment of FIG. 8, allows for relative rotation to occur between the gripper assemblies 12' and the carrier body 104 such that the unit of work material being attached to each gripper assembly 12' may rotate relative to the carrier body 104. This feature allows the unit of work material carried by each gripper assembly 12' to be variably positionable adjacent the work station to further enhance the operator's access to the work material being carried by the hanger 88.

By the foregoing, an improved circular wedge carrier has been described in the preferred embodiment of the invention. However, it should be understood that numerous modifications and substitutions may be made without departing from the spirit of the invention. For example, while the shaft 22' shown in FIG. 10 is disclosed as being circular in cross-section, the square cross-sectional rods 22 shown in FIGS. 1-7 may be employed by the carrier body 104 and may be received within the openings 136 and 138 having a diameter slightly greater than the diameter of the rod 22 as measured between opposite confronting right angles. Also, while the carrier body 104 is shown in the illustrated embodiment having two gripper assemblies, the carrier body may, however, incorporate multiples of two such assemblies symmetrically oriented on opposite sides of the rod 102. Furthermore, while the carrier body 104 is shown in the preferred embodiment of FIG. 8 to include a plurality of the type of grippers disclosed in FIGS. 1-7, it should be understood that the carrier body 104 may be practiced using any number of other gripping devices and therefore is not limited to the type of gripper disclosed relating to FIG. 8. Accordingly, the present invention has been described by way of illustration rather than limitation.

We claim:

1. A hanger for use in a conveyorized system for transporting a unit of limp material from work station to work station, said hanger comprising:
    a body,
    a substantially straight pin having a longitudinal axis and first and second ends, said pin being fixed to said body at said first end and beyond said first end extending to said second end,
    a gripping element mounted on said pin for movement relative to said pin at least axially along said longitudinal pin axis,
    said gripping element having an external gripping surface,
    said body having a gripping surface fixed relative to said body and cooperable with said gripping surface of said gripping element to grip a unit of limp material between said gripping element and said body,
    biasing means urging said gripping element downwardly along said longitudinal pin axis toward said gripping surface of said body,
    said body having a flange extending generally outwardly from the remainder of said body and located near said first end of said pin, and
    said gripping element having a flange extending generally outwardly from the remainder thereof,
    said body flange and said gripping element flange being simultaneously engagable with and manipulatable by the thumb and fingers of an operator's hand to move said gripping element along said longitudinal pin axis against the force of said biasing means away from said gripping surface of said body.

2. A hanger as defined in claim 1 further characterized by said external gripping surface of said gripping element includes a plurality of circular ribs oriented concentrically about said pin longitudinal axis and further includes at least one circular retaining ring oriented concentrically with the longitudinal axis of said pin.

3. A hanger as defined in claim 2 wherein said biasing means is a helical spring member oriented coaxially around said substantially straight pin,
    and said helical spring having a first end and a second end, said first end engaging said body flange bottom surface and said spring second end engaging said gripping element flange top surface thereby biasing said gripping element toward the planar fixed gripping surface.

4. A hanger as defined in claim 2 wherein said external gripping surface is generally conical and defines a cone angle measured relative to said pin longitudinal axis and said body fixed gripping surface is perpendicular to a reference plane containing said pin longitudinal axis and as measured in said reference plane and is inclined relative to said pin longitudinal axis by an angle substantially equal to said cone angle.

5. A hanger as defined in claim 4 further characterized by said external gripping surface of said gripping element having an apparent apex, said circular ribs and said at least one annular ring of said conical gripping surface being arranged adjacent one another and proceeding away from said apex along said longitudinal axis of said pin, each of said ribs having a first end and a second end and said second end having a second end surface and each of said first and said second ends being located in planes perpendicular to said longitudinal axis of said pin with said first end of each rib being located closer to the apex and being of a smaller diameter than said second end, said first end of each rib also being of a smaller diameter than the second end of the preceding adjacent rib located closer to said apex, each of said first and second ends of each of said ribs being connected by an intermediate rib portion, each said intermediate rib portion being oriented relative to said longitudinal axis of said pin at an angle greater than the cone angle of said external gripping surface.

6. A hanger as defined in claim 5 wherein said plurality of gripping ribs are oriented between said apex and said annular ring and said annular ring being oriented within an annular groove interposed between a laterally extending lip projecting from the upper portion of the wedge element and the second end surface of the rib oriented farthest from said apex.

7. A hanger as defined in claim 6 wherein said annular retaining ring is formed from a low durometer nonmarring elastic material.

8. A hanger as defined in claim 7 wherein said nonmarring elastic material is White Buna and the spacing between each of said ribs and the spacing between said lip and said second end surface defining said groove equals approximately 3/16 of an inch.

9. A hanger as defined in claim 1 further characterized by said gripping element being of a plastic material and including hollow spaces giving it a generally thin wall construction substantially throughout its cross-section.

10. A hanger as defined in claim 1 further characterized by a spring clip attached to said body and having a tongue resiliently pressed towards said body to resiliently hold a ticket or label inserted between the tongue and a body.

11. A hanger as defined in claim 1 further characterized by said gripping element having a normal range of sliding movement relative to said pin and said second end of said pin being located within the confines of said gripping element throughout the movement of the circular wedge element within said normal range of sliding.

12. A hanger as defined in claim 1 characterized by said body further defining a top portion having an opening therein for receiving said first end of said pin; said body also defining a vertically extending portion having a vertical axis and said fixed gripping surface being inclined relative to said vertical axis of said vertical portion and partially facing upwardly when said hanger is in normal use.

13. A hanger as defined in claim 12 further characterized by said longitudinal axis of said pin being substantially parallel to said vertical axis of said vertical portion of said body.

* * * * *